(12) United States Patent
Tomita

(10) Patent No.: US 7,332,785 B2
(45) Date of Patent: Feb. 19, 2008

(54) DYE-SENSITIZED SOLAR CELL

(75) Inventor: Takashi Tomita, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/410,603

(22) Filed: Apr. 25, 2006

(65) Prior Publication Data

US 2006/0197170 A1    Sep. 7, 2006

Related U.S. Application Data

(63) Continuation of application No. 10/480,604, filed as application No. PCT/JP03/04518 on Apr. 9, 2003.

(30) Foreign Application Priority Data

Apr. 11, 2002   (JP) ............... 2002-109408

(51) Int. Cl.
*H01L 27/14* (2006.01)

(52) U.S. Cl. ............ 257/436; 257/431; 257/432; 257/450; 257/438; 257/486; 257/E31.129; 257/E51.042; 136/258; 136/263

(58) Field of Classification Search ............ None
See application file for complete search history.

(56) References Cited

U.S. PATENT DOCUMENTS

| | | |
|---|---|---|
| 5,940,550 A | 8/1999 | Plickert et al. |
| 6,376,765 B1 | 4/2002 | Wariishi et al. |
| 6,586,670 B2 | 7/2003 | Yoshikawa |
| 6,602,998 B2 | 8/2003 | Kobuke et al. |
| 6,766,817 B2 | 7/2004 | Silva |
| 6,860,982 B2 | 3/2005 | Okura et al. |
| 6,911,595 B2 | 6/2005 | Yoshikawa et al. |

(Continued)

FOREIGN PATENT DOCUMENTS

EP    1 058 260 A1    12/2000

(Continued)

OTHER PUBLICATIONS

Uchida, Satoshi, "Application of Titania Nanotubes to A Dye-Sensitized Solar Cell," Electrochemistry, Jun. 2002, vol. 70, No. 6, pp. 418-420.

(Continued)

*Primary Examiner*—Sue A. Purvis
*Assistant Examiner*—Fazli Erdem
(74) *Attorney, Agent, or Firm*—Wolf, Greenfield & Sacks, P.C.

(57) ABSTRACT

A dye-sensitized solar cell with high conversion efficiency is provided. The dye-sensitized solar cell according to the present invention has, between an electrode (2) formed on a surface of a transparent substrate (1) and a counter electrode (6), a light-absorbing layer (3) containing light-absorbing particles carrying dye and an electrolyte layer (5), characterized in that the light-absorbing layer (3) containing light-scattering particles (4) different in size from the light-absorbing particles. In such a dye-sensitized solar cell according to the present invention, the energy of light, which passes through a light-absorbing layer in a conventional cell structure, can be strongly absorbed by the dye in the light-absorbing layer of the present invention. This will increase the conversion efficiency and output current of the dye-sensitized solar cell.

1 Claim, 2 Drawing Sheets

U.S. PATENT DOCUMENTS

| | | |
|---|---|---|
| 2002/0015881 A1 | 2/2002 | Nakamura |
| 2002/0031080 A1 | 3/2002 | Inoue |
| 2003/0183271 A1 | 10/2003 | Ikeda et al. |
| 2004/0202064 A1 | 10/2004 | Inoue et al. |
| 2004/0250267 A1 | 12/2004 | Tsutsumi et al. |
| 2005/0016578 A1 | 1/2005 | Enomoto |
| 2005/0022221 A1 | 1/2005 | Inatani et al. |
| 2005/0224112 A1 | 10/2005 | Tokita et al. |
| 2006/0084257 A1 | 4/2006 | Tokita |
| 2006/0107994 A1 | 5/2006 | Morooka et al. |
| 2006/0112988 A1 | 6/2006 | Morooka |
| 2006/0137739 A1 | 6/2006 | Imoto et al. |

FOREIGN PATENT DOCUMENTS

| | | | |
|---|---|---|---|
| EP | 1 100 086 A2 | 5/2001 | |
| EP | 1 152 418 A1 | 11/2001 | |
| EP | 1 156 488 A2 | 11/2001 | |
| EP | 1 431 971 A1 | 6/2004 | |
| JP | 05-225743 | 9/1993 | |
| JP | 07-029350 | 1/1995 | |
| JP | 10-255863 | * | 9/1998 |
| JP | 10-255863 A | 9/1998 | |
| JP | 11-354169 A | 12/1999 | |
| JP | 2000-106222 A | 4/2000 | |
| JP | 2000-195569 A | 7/2000 | |
| JP | 2000-231942 A | 8/2000 | |
| JP | 2000-285975 A | 10/2000 | |
| JP | 2001-93591 A | 4/2001 | |
| JP | 2001-143771 A | 5/2001 | |
| JP | 2001-253883 A | 9/2001 | |
| JP | 2002-8740 A | 1/2002 | |
| JP | 2002-8741 A | 1/2002 | |
| JP | 2002-25635 A | 1/2002 | |
| JP | 2002-175843 A | 6/2002 | |
| JP | 2002-222971 A | 8/2002 | |
| JP | 2002-289269 A | 10/2002 | |
| JP | 2002-289274 A | 10/2002 | |
| JP | 2002-319689 A | 10/2002 | |
| JP | 2002-352868 A | 12/2002 | |
| JP | 2002-352869 A | 12/2002 | |
| JP | 2002-352870 A | 12/2002 | |
| JP | 2002-353432 A | 12/2002 | |
| JP | 2003-036627 | 2/2003 | |
| JP | 2003-051168 | 2/2003 | |

OTHER PUBLICATIONS

Adachi, Motonari, "Dye-Sensitized Solar Cells Using Semiconductor Thin Film Composed of Titania Nanotubes," Electrochemistry, Jun. 2002, vol. 70, No. 6, pp. 449-452.

Adachi, Motonari, "Formation, Characterization, and Functions of Ceramic Nanotubes," Transactions of the Materials Research Society of Japan, Sep. 2002, vol. 27, No. 3, pp. 505-508.

Ngamsinlapasathian, S., "Titania Nanotube o Mochiiru Shikiso Zokan Taiyodenchi no Kokoritsuka," The Society of Chemical Engineers, Japan Dai 35 Kai Shuki Taikai Kenkyu Happyo Koen Yoshishu, Aug. 2002, p. 843.

Ngamsinlapasathian, S., "Higher Efficiency in Dye-Sensitized Solar Cells Using Titania Nanotube,"2002 Nen Denki Kagaku Shuki Taikai Koen Yoshishu, Sep. 2002, p. 138.

Adachi, M., "Formation of Titanium Oxide Nanotubes and Application to Dye-Sensitized Solar Cells," The Electrochemical Society of Japan Dai 68 Kai Taikai Koen Yoshishu, Mar. 2001, p. 112.

Murata, Y., The Synthetic Conditions of Titania Nanotubes Using Template of Molecular Assemblies, CSJ: The Chemical Society of Japan Dai 82 Shuki Nenkai Koen Yokoshu, Sep. 2002, p. 178.

* cited by examiner

DYE-SENSITIZED SOLAR CELL

CROSS REFERENCE TO RELATED APPLICATIONS

This application is a Continuation of application Ser. No. 10/480,604, filed on Jul. 22, 2004, entitled SENSITIZING DYE SOLAR CELL which, in turn, claims priority under 35 U.S.C. 371 and 37 CFR 1.495 to PCT/JP03/04518, filed Apr. 9, 2003, which, in turn, claims priority to Japanese application No. JP2002-109408 filed Apr. 11, 2002.

TECHNICAL FIELD

The present invention relates to a dye-sensitized solar cell and particularly to a dye-sensitized solar cell with an improved conversion efficiency expressed by the ratio of the cell output to the quantity of incident light.

BACKGROUND ART

In Japan, photovoltaic power generation systems are now being commercially introduced and coming into widespread use. Although some p-n junction silicon solar cells are available on the market, their electricity prices are much higher than those of distribution lines. Accordingly, inexpensive solar cells are required for the proliferation of photovoltaic power generation systems. FIG. 3 is a schematic diagram showing a cross-sectional structure of a conventional dye-sensitized solar cell. Reference numeral 101 represents a glass substrate, and reference numeral 102 represents an electrode that is provided on the lower surface of the glass substrate 101 and that is composed of a transparent material, for example, tin oxide ($SnO_2$) doped with fluorine (F). Reference numeral 103 represents a light-absorbing layer of fine semiconductor particles 103a deposited on the electrode 102 and composed of titanium oxide with a particle size of about 50 nm or less, dye 103b being adsorbed on the surfaces of the fine semiconductor particles. The light-absorbing layer 103 is formed in a film about 10 μm or less in thickness. An electrolyte 104 includes or infiltrates the light-absorbing layer 103. Reference numeral 105 represents a counter-electrode.

Such a dye-sensitized solar cell, as compared with a semiconductor p-n junction solar cell, has an advantage that it can convert light at longer wavelengths into electricity. In addition, the dye-sensitized solar cell has another advantage in that it can be manufactured using less energy than the p-n junction solar cell, which requires considerable energy for its manufacture.

While the dye-sensitized solar cell has such advantages, however, its low conversion efficiency stands in the way of commercialization. This low conversion efficiency is caused by high transmission of light of long wavelengths in the light-absorbing layer 103 because of the very low light absorptivity of the dye 103b. To improve the conversion efficiency, the light-absorbing layer 103 composed of the fine semiconductor particles 103a carrying dye 103b may be increased in thickness. However, a thicker light-absorbing layer 103 will cause a problem of further reduced conversion efficiency, because the light-absorbing layer 103 structurally has high series resistance.

In contrast, reducing the thickness of the light-absorbing layer 103 to decrease the series resistance will increase the transmission of long-wavelength light, lowering the light absorption efficiency. In both cases, therefore, it is difficult to increase the conversion efficiency. Consequently, a dye-sensitized solar cell that satisfies these contradictive requirements for conversion efficiency and light absorption efficiency as described above has not yet been developed.

In light of the existing problems described above, an object of the present invention is to provide a dye-sensitized solar cell with high conversion efficiency.

DISCLOSURE OF INVENTION

A dye-sensitized solar cell according to the present invention comprises, between an electrode formed on a transparent substrate and the counter electrode, a light-absorbing layer including light-absorbing particles carrying sensitizing dye, and an electrolyte layer, characterized in that the light-absorbing layer contains light-scattering particles different in size from the light-absorbing particles.

In such a dye-sensitized solar cell according to the present invention, the addition of light-scattering particles that are different in size from the light-absorbing particles to the light-absorbing layer causes incident light on a light-collecting layer to be adequately scattered, thus increasing the optical path length through the light-absorbing layer. This enhances the absorption of the scattered light by the dye adsorbed on the light-absorbing particles and leads to greatly increased light absorption. As a result, the energy of light, which passes through the light-absorbing layer in the conventional cell structure, can be strongly absorbed by the dye in the light-absorbing layer. This will increase the conversion efficiency and output current of the dye-sensitized solar cell.

Moreover, the dye-sensitized solar cell that has such a structure according to this invention does not require a thicker light-absorbing layer for higher conversion efficiency; therefore, the series resistance of the light-absorbing layer is not increased and thus reduction in the conversion efficiency due to the increased thickness of the light-absorbing layer does not occur. Accordingly, the conversion efficiency can be improved while maintaining the small thickness of the light-absorbing layer.

Furthermore, these effects are particularly noticeable for long-wavelength light. Low conversion efficiency due to high transmission of long-wavelength light can be compensated for while maintaining the small thickness of the light-absorbing layer, and thus the conversion efficiency can be increased.

BEST MODE FOR CARRYING OUT THE INVENTION

The present invention will now be described in detail with reference to the drawings. This invention is not limited to the description below and may be modified as appropriate without departing from the gist of the invention.

A dye-sensitized solar cell according to the present invention comprises, between an electrode formed on a transparent substrate and the counter electrode, a light-absorbing layer including light-absorbing particles carrying sensitizing dye, and an electrolyte layer, characterized in that the light-absorbing layer contains light-scattering particles different in size from the light-absorbing particles.

The size of particles in this invention may be determined microscopically or as a mean particle diameter.

Figure 1:
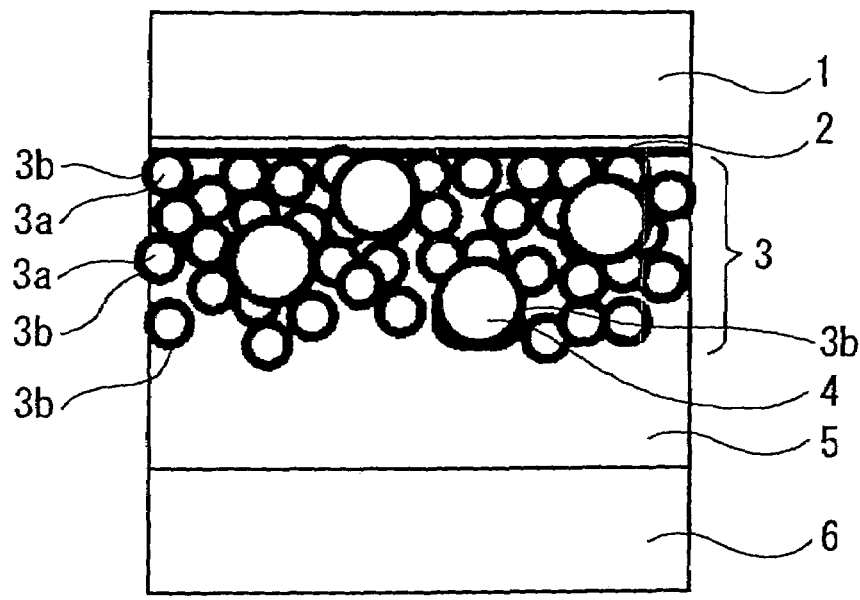
FIG. 1 is a cross-sectional view showing the structure of a dye-sensitized solar cell according to the present invention.

FIG. 1 is a schematic cross-sectional view showing the cross-sectional structure of a dye-sensitized solar cell according to the present invention. The dye-sensitized solar cell includes a transparent substrate 1, an electrode 2, a light-absorbing layer 3, light-scattering particles 4, an electrolyte layer 5, and a counter electrode 6.

The transparent substrate 1 is not particularly limited and may be a glass substrate.

The electrode 2 is composed of a transparent material and is formed on the lower surface of the transparent substrate 1. Any material that is electrically conductive and transparent may be used in the electrode 2. Tin oxide may be suitable due to its high electrical conductivity, transparency, and heat-resistance, and indium tin oxide (ITO) is preferred in view of cost.

The light-absorbing layer 3 contains light-absorbing particles deposited on the electrode 2. The light-absorbing particles carry dye $3b$ that absorbs light incident on the light-absorbing layer 3 from the transparent substrate 1 through the electrode 2. The light-absorbing particles are fine semiconductor particles $3a$ that can adsorb the dye $3b$ on their surfaces. The fine semiconductor particles $3a$ may be composed of elemental semiconductors, such as silicon semiconductors, compound semiconductors, or compounds with a perovskite structure. Preferably, these semiconductors are n-type semiconductors, in which conduction band electrons behave as carriers under photoexcitation to generate an anodic current. Exemplary semiconductors are, but not limited to, titanium dioxide (titania, $TiO_2$), tin dioxide ($SnO_2$), zinc oxide (ZnO), tungsten trioxide ($WO_3$), niobium oxide ($Nb_2O_5$), and titanium strontium oxide ($TiSrO_3$). In particular, the semiconductor is preferably anatase $TiO_2$. These semiconductors may be used alone or in combination. In addition, the light-absorbing particles preferably have a large surface area to allow an increased quantity of light to be absorbed; hence, the diameter of the fine semiconductor particles is preferably about 20 nm or less.

Preferably, an example of the dye $3b$ that is adsorbed on the fine semiconductor particles is, but not limited to, ruthenium dye. As long as it functions as a charge separator and sensitizer, the dye $3b$ may be of any type. Thus, in addition to the ruthenium dye, xanthene dyes, such as rhodamine B, rose bengal, eosin, and erythrosine; cyanine dyes, such as quinocyanine and kryptocyanine; basic dyes, such as phenosafranine, fog blue, thiosine, and methylene blue; porphyrins, such as chlorophyll, zinc porphyrin, and magnesium porphyrin; azo dyes; phthalocyanine compounds; complex compounds, such as ruthenium trisbipyridyl; anthraquinone dyes; and polycyclic quinone dyes may be used alone or in combination.

The light-absorbing layer 3 preferably has a thickness of 15 μm or less. The light-absorbing layer 3 structurally has high series resistance, which causes low conversion efficiency. The light-absorbing layer 3 with a thickness of 15 μm or less achieves low series resistance of the light-absorbing layer 3, while the absorptivity of the light-absorbing layer 3 is maintained. This prevents a reduction in the conversion efficiency.

The light-scattering particles 4 that are contained in the light-absorbing layer 3 scatter light incident on the light-absorbing layer 3 from the transparent substrate 1 through the electrode 2. The light-scattering particles 4 are different in size from the light-absorbing particles. More precisely, the light-scattering particles 4 are larger than the light-absorbing particles. Addition of such light-scattering particles 4 into the light-absorbing layer 3 allows the light incident on the light-absorbing layer 3 to be scattered adequately. The scattered light has a much larger optical path length in the light-absorbing layer 3 than that of light directly passing through the light-absorbing layer 3. This enhances the absorption of light by the dye $3b$ on the light-absorbing particles and allows a much larger quantity of light to be absorbed. Thus, a much lower quantity of light reaches the electrolyte layer through the light-absorbing layer 3. This compensates for the low absorptivity of the dye $3b$ and thus increases the conversion efficiency.

These effects enhance the conversion efficiency without increasing the thickness of the light-absorbing layer 3. This prevents the series resistance of the light-absorbing layer 3 from increasing and does not cause low conversion efficiency due to increased series resistance. Accordingly, it is possible to enhance the conversion efficiency with a thin light-absorbing layer 3.

The above effects are particularly noticeable in long-wavelength light, compensate for the low conversion efficiency resulting from high transmission of the long-wavelength light, and can enhance the conversion efficiency.

Such light-scattering particles 4 have a particle diameter from about 20 nm to 100 nm, and are made of high-refractive-index material, such as rutile titanium dioxide. By designing the particle size of the light-scattering particles 4 to be slightly larger than one-twentieth of the target wavelength, it is possible to ensure scattering of light regardless of the small size of the light-scattering particles.

The light-scattering particles 4 and the light-absorbing particles may be made of the same material. By carrying the dye $3b$ on the light-scattering particles 4 made of the same material as used in the light-absorbing particles, the light-scattering particles 4 not only scatter the light incident on the light-absorbing layer 3, but also absorb light.

In addition, the light-scattering particles 4 may be made of a material different from that used in the light-absorbing particles. Even in this case, by carrying the dye $3b$ on the material that is different from the material used in the light-absorbing particles but that can be used for the light-absorbing particles, the light-scattering particles 4 not only scatter the light incident on the light-absorbing layer 3, but also absorb light.

As described above, providing the light-absorbing layer 3 containing the light-scattering particles 4, rather than providing another layer consisting solely of the light-scattering particles 4, allows effective use of space by filling the vacant spaces among the large light-scattering particles 4 with the small light-absorbing particles. As described above, the light-scattering particles 4 themselves also can serve as light-absorbing particles. Therefore, these improve the light-absorption coefficient and can reduce the thickness of the dye-sensitized solar cell.

The electrolyte layer 5 contains an electrolyte and may include the light-absorbing layer 3 or may be provided such that the electrolyte infiltrates the light-absorbing layer 3. An example of the electrolyte is, but not limited to, a propylene carbonate solution of iodine or any known electrolyte having a hole conducting function.

The counter electrode 6 may be made of any conductive substance. It may also be made of an insulating substance having a conductive layer that faces a semiconductor electrode. Preferably, the counter electrode may be made of an electrochemically stable material, in particular, platinum, gold, carbon, and so on. Moreover, to enhance redox catalytic effects, the surface of the counter electrode that faces the semiconductor electrode preferably has a microstructure and therefore an increased surface area. For example, platinum is preferably platinum black and carbon is preferably porous carbon. Platinum black may be formed by anodic oxidation coating of platinum, treatment of chloroplatinic acid, or the like. Porous carbon may be formed by sintering of fine carbon particles, burning of organic polymers, or the like.

The structure of such a dye-sensitized solar cell according to the present invention is characterized in that, as described above, the addition of the light-scattering particles 4 into the light-absorbing layer 3 causes light that is incident from the transparent substrate 1 and passes through the light-absorbing layer 3 to be more strongly absorbed by the dye 3b. Addition of the light-scattering particles 4 to the light-absorbing layer 3 allows light incident from the transparent substrate 1 to be scattered sufficiently and thus increases the optical path length through the light-absorbing layer 3. As a result, the scattered light is easily absorbed by the dye 3b on the light-absorbing particles, and the quantity of light absorbed by the dye 3b on the light-absorbing particles is much increased. This allows much of the energy of light, which passes through the light-absorbing layer 3 in the conventional structure, to be absorbed by the dye 3b in the light-absorbing layer 3. Accordingly, the conversion efficiency and therefore the output current of the dye-sensitized solar cell can be increased.

These effects enhance the conversion efficiency without increasing the thickness of the light-absorbing layer 3. This prevents the series resistance of the light-absorbing layer 3 from increasing and does not cause low conversion efficiency due to increased series resistance. Accordingly, it is possible to enhance the conversion efficiency with a thin light-absorbing layer 3.

Furthermore, these effects are particularly noticeable in long-wavelength light. The low conversion efficiency due to the high transmission of long-wavelength light can be compensated for while maintaining the reduced thickness of the light-absorbing layer 3 and thus the conversion efficiency can be increased. Therefore, it is possible to produce a dye-sensitized solar cell that has a thin light-absorbing layer 3 while satisfying the requirements for conversion efficiency and light absorption efficiency.

The following describes the light-scattering rate of the light-absorbing layer 3 in the dye-sensitized solar cell according to the present invention as described above, the light-scattering particles 4, and the volume fraction of the light-scattering particles 4 in the light-absorbing layer 3. A dye-sensitized solar cell according to the present invention was prepared as shown in FIG. 1. The details of the dye-sensitized solar cell are as follows. The transparent substrate 1 used was a glass substrate. Indium tin oxide (ITO) was deposited on a main surface of the transparent substrate 1 to form the electrode 2. Light-absorbing particles were stacked on the electrode 2 to form the light-absorbing layer 3 with a thickness of 10 μm. TiO$_2$ particles with a particle size of 10 nm were used as the fine semiconductor particles 3a. The light-absorbing particles were formed by adsorbing ruthenium dye on the TiO$_2$ particles. The light-absorbing layer 3 had light-scattering particles 4 added thereto. A propylene carbonate solution of iodine was used in the electrolyte layer 5. The counter electrode was made of platinum.

Figure 2:
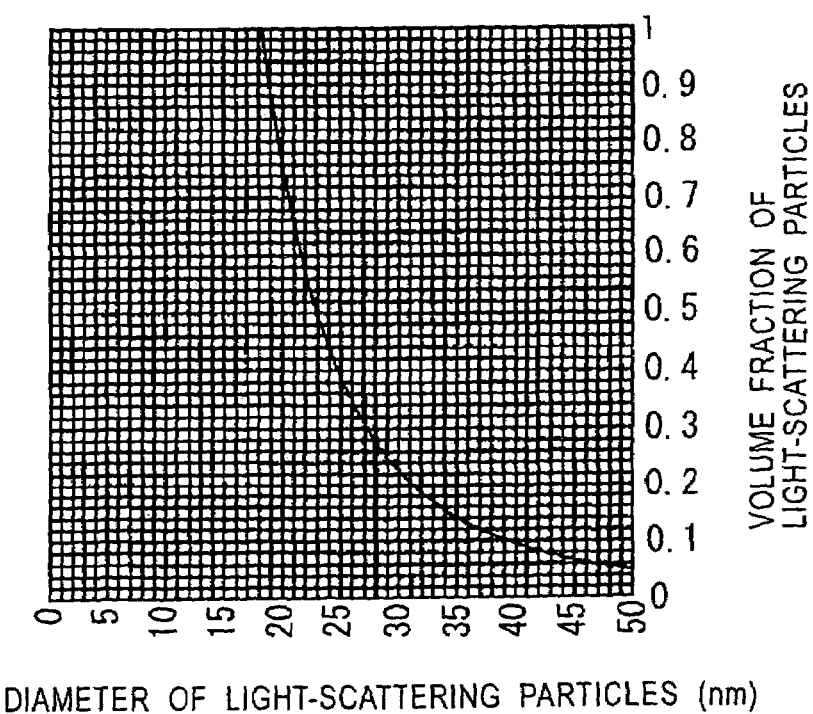
FIG. 2 is a characteristic graph showing the relationship between the diameter and the volume fraction of light-scattering particles at a light-scattering rate of 50% where a light-absorbing layer 10 μm in thickness is irradiated with light at a wavelength of 600 nm.
Figure 3:
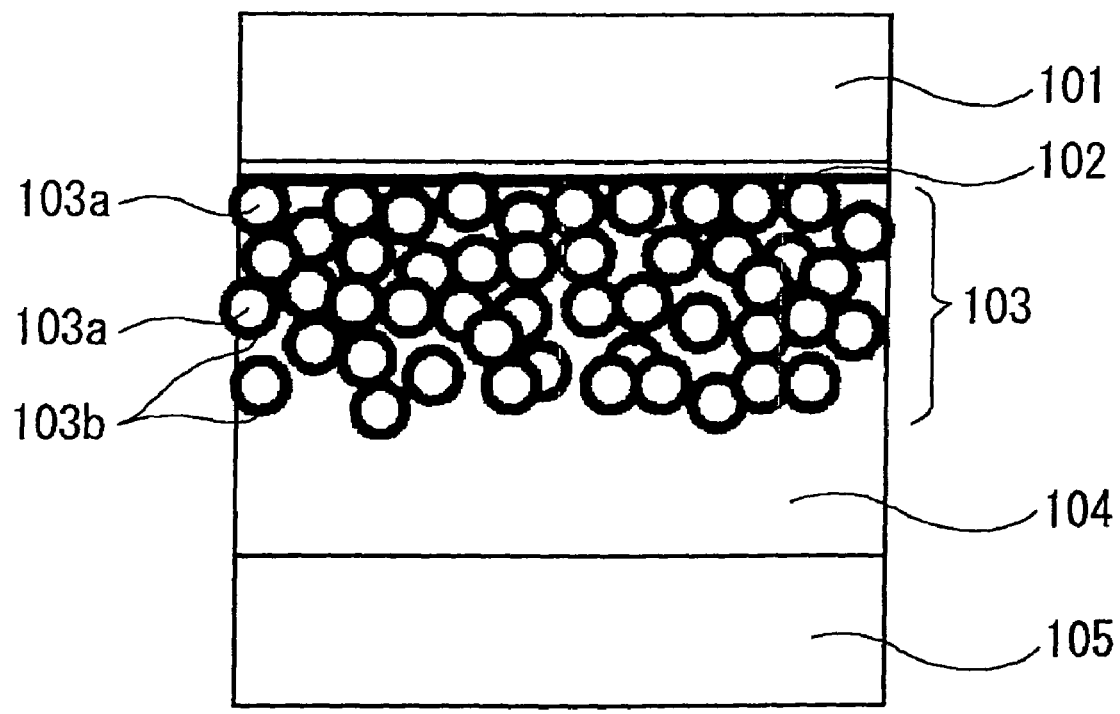
FIG. 3 is a cross-sectional view showing the structure of a conventional dye-sensitized solar cell.

The relation between the diameter and the volume fraction of the light-scattering particles was studied where such a dye-sensitized solar cell was irradiated with light at a wavelength of 600 nm and the light-scattering rate by Rayleigh scattering was 50%. FIG. 2 shows the result. The light-absorbing layer 3 in the presence of the light-scattering particles absorbs half the transmitted light in the absence of the light-scattering particles, and accordingly the light-absorbing rate is increased. When the light-scattering rate is 50% or less, the cell is only slightly improved in performance and of no practical use. When the light-scattering rate exceeds 50%, improvement in the conversion efficiency is significant. If a light-scattering efficiency of 50% is achieved, it is possible to obtain high conversion efficiency and produce a dye-sensitized solar cell for practical use.

The light-scattering efficiency depends on the size and volume fraction of the light-scattering particles. The volume fraction of close-packed spheres is about 66%. When the light-scattering efficiency is 50%, the size of the light-scattering particles for achieving maximum packing is about 20 nm. Therefore, light-scattering particles not less than 20 nm will ensure a light-scattering efficiency of 50%. On the other hand, when the size of the light-scattering particles is 100 nm or larger, the fraction of the light-scattering particles in the light-absorbing layer 3 becomes too large and the fraction of light-absorbing particles in the light-absorbing layer 3 becomes too small. As a result, the surface area in the light-absorbing layer 3, or area for absorbing light becomes too small. This lowers the light conversion efficiency of the dye-sensitized solar cell and thus makes the cell of no practical use. Accordingly, as described above, the size of the light-scattering particles 4 is preferably about 20 nm to 100 nm.

Japanese Unexamined Patent Application Publication No. 10-255863 discloses a dye-sensitized solar cell in which a light-absorbing layer containing small light-absorbing particles is disposed on a layer containing large light-reflecting particles. An experiment demonstrated that the maximum light absorptivity was only 0.8 in this case, while it was 1.0 for the dye-sensitized solar cell according to the present invention.

A dye-sensitized solar cell according to the present invention comprises, between an electrode formed on a transparent substrate and the counter electrode, a light-absorbing layer including light-absorbing particles carrying sensitizing dye, and an electrolyte layer, wherein the light-absorbing layer contains light-scattering particles different in size from the light-absorbing particles.

With a thus-constituted dye-sensitized solar cell according to the present invention, the absorption of light by the light-absorbing layer 3 can be increased without increasing the thickness of the layer or increasing the series resistance of the layer. Therefore, it is possible to produce a dye-sensitized solar cell that has a thin light-absorbing layer and satisfies the requirements for conversion efficiency and light absorption efficiency. The dye-sensitized solar cell can absorb much of the energy of light, which passes through the light-absorbing layer in the conventional cell. Thus, the output current of the dye-sensitized solar cell can be increased.

Accordingly, the present invention provides a dye-sensitized solar cell with high conversion efficiency.

The invention claimed is:

1. A photocell comprising, between an electrode formed on a surface of a substrate and a counter electrode:

light-absorbing particles carrying dye, light-scattering particles different in size from the light-absorbing particles, and an electrolyte;

wherein the light-absorbing particles are interspersed with the light-scattering particles;

wherein a particle size of the light-scattering particles is larger than a particle size of the light-absorbing particles;

wherein the particle size of the light-absorbing particles is 20 nm or less.

* * * * *